United States Patent
Barth et al.

(10) Patent No.: US 9,779,622 B2
(45) Date of Patent: Oct. 3, 2017

(54) METHOD AND DEVICE FOR ASSISTING A DRIVER WHEN DRIVING A VEHICLE

(71) Applicant: DAIMLER AG, Stuttgart (DE)

(72) Inventors: Alexander Barth, Redwood City, CA (US); Christian Gruenler, Ergenzingen (DE); Markus Hammori, Deufringen (DE); Lars Lütze, Esslingen (DE); Marc Necker, Weil der Stadt (DE); Dirk Olszewski, Paderborn (DE); Matthias Schulze, Muehlacker (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/124,797

(22) PCT Filed: Feb. 13, 2015

(86) PCT No.: PCT/EP2015/000319
§ 371 (c)(1),
(2) Date: Sep. 9, 2016

(87) PCT Pub. No.: WO2015/135621
PCT Pub. Date: Sep. 17, 2015

(65) Prior Publication Data
US 2017/0025005 A1 Jan. 26, 2017

(30) Foreign Application Priority Data
Mar. 12, 2014 (DE) .................. 10 2014 003 550

(51) Int. Cl.
*G08G 1/0967* (2006.01)
*H04N 5/232* (2006.01)
(Continued)

(52) U.S. Cl.
CPC ... *G08G 1/096758* (2013.01); *G06K 9/00771* (2013.01); *G06K 9/00805* (2013.01);
(Continued)

(58) Field of Classification Search
CPC ........... G06K 9/00771; G06K 9/00805; G06K 9/00825; G08G 1/09623; G08G 1/096716;
(Continued)

(56) References Cited

U.S. PATENT DOCUMENTS

2003/0083790 A1* 5/2003 Hattori ............... G06K 9/00651
701/1
2005/0159893 A1* 7/2005 Isaji ..................... G01S 17/023
701/301
(Continued)

FOREIGN PATENT DOCUMENTS

DE 102011115739 A1 4/2013
EP 1503354 A1 2/2005

OTHER PUBLICATIONS

International Search Report dated May 12, 2015 in related International Application No. PCT/EP2015/000319.
(Continued)

*Primary Examiner* — Sisay Yacob
(74) *Attorney, Agent, or Firm* — Patent Portfolio Builders PLLC

(57) ABSTRACT

A method for supporting a driver driving a vehicle involves monitoring an environment surrounding the vehicle, detecting road users at a crossing or intersection, and emitting indications concerning priority rules to the driver. The indications are emitted to the driver as symbols overlapping the surrounding environment on a display unit or overlapping an image of the surrounding environment.

16 Claims, 3 Drawing Sheets

Figure 1:
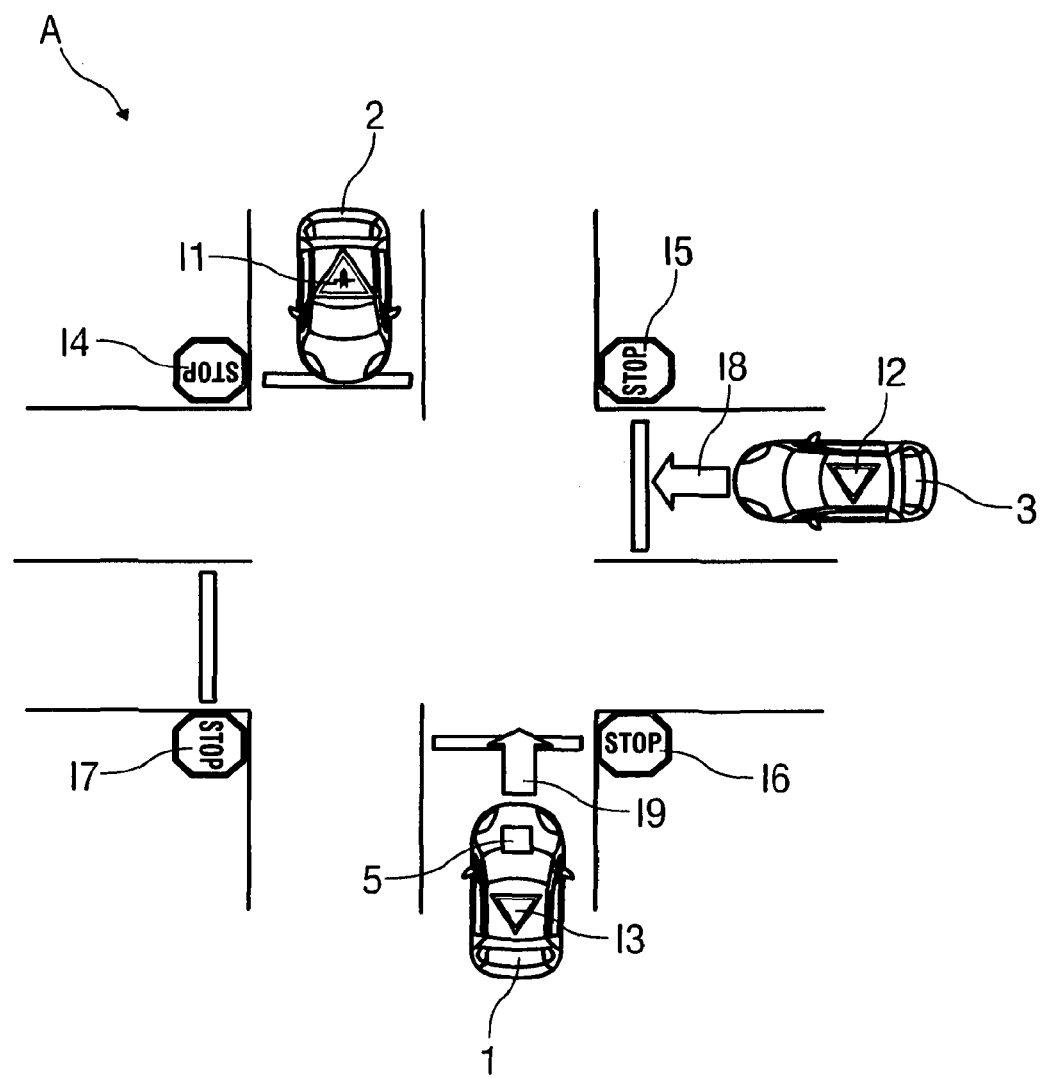

(51) Int. Cl.
*G06K 9/00* (2006.01)
*G08G 1/0962* (2006.01)
*G08G 1/16* (2006.01)

(52) U.S. Cl.
CPC ... *G08G 1/09623* (2013.01); *G08G 1/096716* (2013.01); *G08G 1/166* (2013.01); *H04N 5/23293* (2013.01); *G06K 9/00825* (2013.01)

(58) Field of Classification Search
CPC . G08G 1/096758; G08G 1/66; H04N 5/23293
See application file for complete search history.

(56) References Cited

U.S. PATENT DOCUMENTS

| | | | | |
|---|---|---|---|---|
| 2005/0201590 | A1* | 9/2005 | Kudo | B60W 30/16 382/103 |
| 2007/0035416 | A1* | 2/2007 | Tanaka | B60T 7/18 340/906 |
| 2007/0276600 | A1* | 11/2007 | King | G08G 1/042 701/301 |
| 2008/0162027 | A1 | 7/2008 | Murphy et al. | |
| 2009/0140845 | A1* | 6/2009 | Hioki | B60K 35/00 340/425.5 |
| 2014/0285523 | A1 | 9/2014 | Gruenler et al. | |

OTHER PUBLICATIONS

Written Opinion Report dated May 12, 2015 in related International Application No. PCT/EP2015/000319.

* cited by examiner

METHOD AND DEVICE FOR ASSISTING A DRIVER WHEN DRIVING A VEHICLE

BACKGROUND AND SUMMARY OF THE INVENTION

Exemplary embodiments of the invention relate to a method to support a driver when driving a vehicle, wherein a surrounding environment of the vehicle is monitored, road users are detected at a crossing or intersection and indications of priority rules are emitted to the driver.

Exemplary embodiments of the invention also relate to a device to support a driver when driving a vehicle, having at least one monitoring unit to monitor a surrounding environment of the vehicle, having at least one detection unit to detect road users at a crossing or intersection and having at least one display unit to emit indications of priority rules to the driver.

US Patent document US 2008/0162027 A1 discloses a method and device enabling a vehicle to follow a traffic regulation, in particular a priority rule, at a crossing when driving in a road network. The device comprises a database to store features relating to the road network, a position detector to detect a position of the vehicle relative to the road network, and a sensor to detect an object in a surrounding environment of the vehicle. A processing system controls the vehicle in such a way that the vehicle autonomously follows a traffic regulation. Alternatively, a signal or warning is emitted to a driver of the vehicle in order to enable the drive to follow the traffic regulation. This control of the vehicle or the emission of the signal is based on the detected position of the vehicle, on data retrieved from the database and connected to at least one feature of the road network and on data with regard to at least one object detected by the sensor. Here, the vehicle that reaches the crossing first has priority.

Exemplary embodiments of the invention are directed to an improved method to support a driver when driving a vehicle and an improved device to support a driver when driving a vehicle.

In a method to support a driver when driving a vehicle, a surrounding environment of the vehicle is monitored, road users are detected at a crossing or intersection and indications of priority rules are emitted to the driver.

According to the invention, the indications are emitted to the driver overlapping the environment by means of symbols on a display or overlapping an image of the environment.

Therefore, valid priority rules can be optically depicted to the driver in a manner that is clear and simple to understand at a respective crossing or intersection and in a traffic situation there, such that the driver is supported when driving the vehicle and road safety is increased. The thus generated depiction in the form of augmented reality shows the traffic situation and the associated priority rules to the driver in a manner that is clear and easy to understand.

BRIEF DESCRIPTION OF THE DRAWING FIGURES

Exemplary embodiments of the invention are explained below in more detail by means of drawings.

Figure 2:
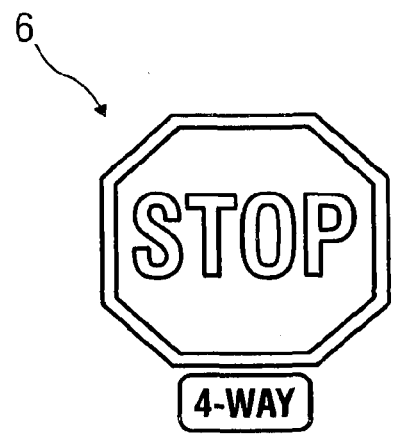
Figure 3:
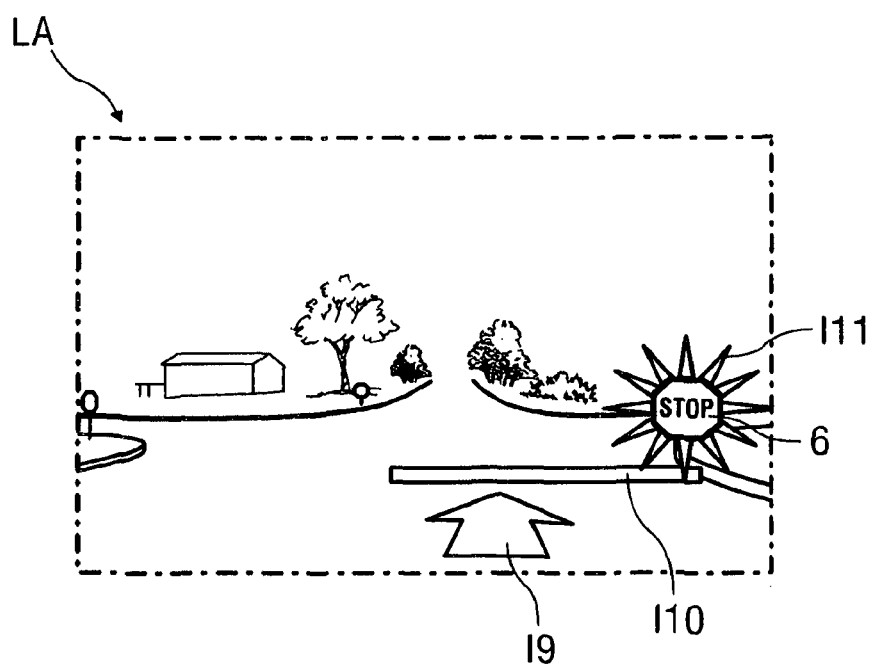
Figure 4:
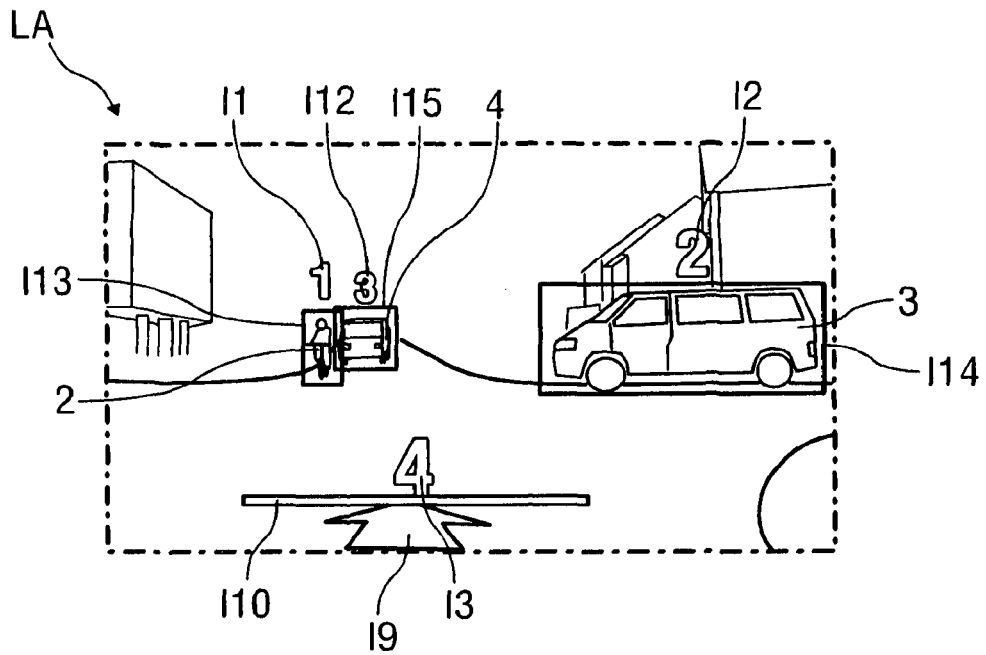
Figure 5:
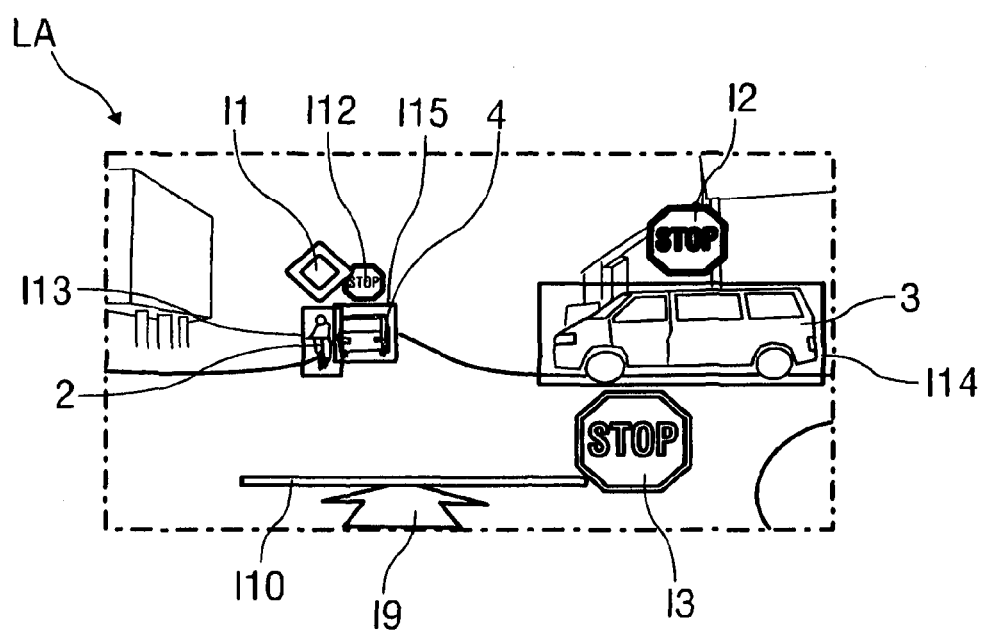

Here are shown:

FIG. 1 schematically, an image of a first surrounding environment of a vehicle with an overlapping of the image by optical information, FIG. 2 schematically, a road sign, FIG. 3 schematically, a live view of a second surrounding environment of a vehicle with an overlapping of the image by optical information, FIG. 4 schematically, a first image of a third surrounding environment of a vehicle with an overlapping of the image by optical information, and FIG. 5 schematically, a second image of the third surrounding environment with an overlapping of the image by optical information.

Parts corresponding to one another are provided with the same reference numerals in all figures.

DETAILED DESCRIPTION

In FIG. 1, an image A of a first surrounding environment of a vehicle 1 is depicted with an overlapping of image A by optical information I1 to I9.

Here, the vehicle 1 approaches a coequal crossing without traffic light regulation, also referred to in English-speaking regions as a "four-way stop intersection". A road user 2 likewise formed as a vehicle is already waiting at the crossing and a further road user 3 formed as a vehicle approaches the crossing. The function of exemplary embodiments described below is here not limited to such coequal crossings, but can also be applied for intersections and turnings as well as crossings with a deviating number of intersecting roads.

The vehicle 1 comprises a device 5 to support a driver of the vehicle 1 when driving the vehicle. By means of the device 5, a surrounding environment 1 is monitored and a traffic situation at crossings, intersections and turnings is detected. From this information, a priority right of the vehicle 1 and the road users 2, 3 is determined using stored regulations. This priority right results, for example, in the USA from an order of arrival of the vehicle 1 and the road users 2, 3 at a crossing, intersection or turning.

Here, a behavior of the other road users 2, 3 is monitored and the order of arrival is evaluated. A driving recommendation is emitted in the vehicle interior onto a display unit (not shown), for example a conventional display, a so-called heads-up display and/or a display of a mobile terminal device by means of the device 5. The arrival itself remains the responsibility of the driver of the vehicle 1. A visualization of the indications of and recommendations for the priority rules occurs using the optical information I1 to I9, which overlap a live view LA depicted in more detail in FIG. 3 as symbols on the display unit or, as in the depicted exemplary embodiment, overlaps an image A of the surrounding environment, and therefore are emitted to the driver in the form of an augmented reality.

Here, in the depicted exemplary embodiment, pictograms overlapping the vehicle 1 and the road users 2, 3 are generated as optical information I1 to I3, which depict a road sign regulating priority and therefore show to the driver of the vehicle 1 who may drive on and drive over the crossing in what order at the depicted crossing.

Furthermore, road signs located at the road crossing are likewise emitted in the form of pictograms as optical information I4 to I7 at corresponding positions in image A.

Furthermore, it is depicted by the optical information I8, I9 formed as an arrow depiction that both the vehicle 1 and the road user 3 are approaching the road crossing.

The device 5, which comprises, in a way that is not depicted in more detail, a surrounding environment detection unit and is coupled to this, recognizes that the particular vehicle 1 is approaching a crossing without traffic light regulation, for example using map data of a digital map in which the crossing is stored as a "crossing without traffic lights" or as a so-called "four-way stop intersection".

Alternatively or additionally, the device 5 recognizes the approach to such a crossing using map data from which only a crossing emerges without further details. In this case, additionally, algorithms for image recognition and evaluation are used in order to recognize that the crossing does not have traffic light regulations.

Alternatively or additionally, the device 5 recognizes the approach to such a crossing using positioned road signs 6. Such a road sign 6 is depicted, for example, in FIG. 2.

The device 5 is here formed in such a way that this can be activated and deactivated when desired. If the device 5 is active, the device monitors the surrounding environment of the vehicle and the traffic situation, unnoticed by the driver of the vehicle 1. As soon as it is recognized that the particular vehicle 1 is approaching a crossing without traffic light regulation, the device 5 activates the visualization of the surrounding environment of the vehicle on the display element, overlapped with the optical information I1 to I9. As soon as, for example, the driver has activated the device 5, this is depicted by overlaying a corresponding symbol onto the live view LA or the image A.

At the same time, the device 5 detects whether other road users 2, 3 are approaching the crossing from other driving directions or are already located in the crossing region. For this purpose, for example, generally known algorithms for image recognition and image evaluation as well as lidar, radar, ultrasound and/or other sensors are used. Use of information resulting from a so-called vehicle-to-vehicle communication and/or vehicle-to-infrastructure communication is also possible. In particular vehicles, pedestrians and motorized or unmotorized two-wheeled cyclists in the crossing area are recognized as road users by means of the device 5 and the behavior thereof is taken into account.

Here, movement trajectories of the other road users 2, 3 are analyzed by the device 5 in order to determine when the road users 2, 3 reach the crossing region. Therefore, a ranking or order is already generated proactively and with involvement of the movement trajectory of the vehicle in question 1, in which all recognized road users 2, 3 and the vehicle in question 1 are noted in their order of arrival.

Furthermore, the further traffic situation is observed by the device 5 and, depending on an actual point in time of arrival of the road users 2, 3 and the vehicle in question 1, the ranking is adapted.

If the vehicle in question 1 has approached up to a certain distance from a crossing, it is signaled to the driver by means of the device 5 whether he may drive or not.

As is shown in a live view LA depicted in more detail in FIG. 3, first when approaching the crossing, either a stop line relevant for the vehicle in question 1 or present on a road surface is emphasized by a piece of optical information I10 formed as a colored marking or overlay, or a virtual stop line is projected into the live view LA by means of the piece of optical information I10. Additionally, the road sign 6 relevant for the vehicle in question 1 is emphasized optically by overlapped depiction of the surrounding environment using the piece of optical information I11 formed as a marking.

The visualization can, in the case of use of a head-up display, in particular be limited to the overlaying of a symbol, for example to a pictogram-type depiction of the crossing situation. Additionally, it can be signaled to the driver that the driver should stop at the stop line. Such a signaling can occur by overlaying a corresponding symbol, overlaying a corresponding road sign, arranging the symbol or road sign on the relevant stop line and/or by an aural signal.

If the device 5 detects the risk exists that the driver will drive over the relevant stop line without stopping, then in addition to the visualizations referred to, an optical warning can be overlaid or the surrounding environment can be overlapped with a corresponding location reference for the relevant stop line. Alternatively or additionally, an aural warning is also possible.

As soon as the vehicle in question 1 is located in the crossing area or shortly before this, the device 5 signals the current priority situation to the driver.

In one possible embodiment, the signaling occurs schematically by an image A on the display unit. Here, a symbol system is overlaid as optical information I1 to I11, for example a pictogram, which represents the crossing situation. Furthermore, all involved road users 2, 3 are also depicted in a symbolized manner. The road user currently entitled to priority is depicted as emphasized. The emphasis occurs by colored or another marking. Additionally, a warning can be symbolized as long as the vehicle in question 1 is still not entitled to drive. Likewise, a warning of pedestrians can be symbolized.

In the further possible embodiment which FIG. 4 shows, the signaling occurs by the depicted overlapping of the surrounding embodiment with the optical information I1, to I3, I9, I10, I12 to I15 on the display unit. Here such road users 2, 3, 4 which are located in the field of vision of the head-up display or on the image A are overlapped or augmented in a contact analogue manner by means of the optical information I13 to I15, for example by framing or colored overlapping. The coloring or other design features can vary here depending on the order or hazard potential of the respectively depicted road users 2 to 4.

Here, depending on a formation of the crossing or intersection, the order of the vehicle 1 and the road users 2 to 4 for driving on and/or driving over the crossing is determined from positions of the road users and the priority rules, wherein additionally the optical information I1 to I3, I12 for the order is depicted as digits overlapping the environment.

As an alternative indication the optical information I1 to I3, I12 regarding the order can be depicted as road signs overlapping the environment, as is shown in FIG. 5.

In order to signal to the driver that the vehicle in question 1 is still not next in line to drive, a warning symbol or a virtual stop line is additionally depicted as optical information I10, overlapping the surrounding environment.

The priority situation for the vehicle in question can, differently, for example, also be symbolized by a direction arrow that is depicted overlapping the surrounding environment in a contact-analogue manner on the road surface in front of the vehicle in question 1. This is depicted in particular in such a way that the color thereof or other design features change as soon as the priority position changes. The color can here, for example, change from red to green if the vehicle in question 1 may drive.

According to a further embodiment, the overlapping of the crossing situation described above can also be achieved by means of an overlapped video as a so-called "augmented video", for example in a live recording camera perspective of the display unit.

Independently of the embodiment therefore, it applies for all embodiments of the device 5 that, if the device 5 recognizes that the vehicle in question 1 is entitled to priority or may drive without risk for other reasons, a corresponding visualization, i.e. depiction on the display unit, occurs.

In a so-called offensive form, here an overlaying of all previous warnings and overlappings or at least a schematic overlaying of a corresponding indication occurs, which signals to the driver that he may now drive.

In a so-called defensive form, an exclusive overlaying of all previous warnings occurs. A driving recommendation, however, does not occur.

Although the present invention has been described above by means of embodiments with reference to the enclosed drawings, it is understood that various changes and developments can be implemented without leaving the scope of the present invention, as it is defined in the enclosed claims.

The invention claimed is:

1. A method to support a driver when driving a vehicle, the method comprising:
    monitoring a surrounding environment of the vehicle;
    detecting road users at a crossing or intersection;
    evaluating an order of arrival of the road users at the crossing or intersection;
    emitting, to the driver, indications of priority rules based on the evaluated order of arrival,
    wherein the indications of priority rules are emitted to the driver as symbols (1) overlapping the surrounding environment on a display unit or (2) overlapping an image of the surrounding environment,
    wherein the emitted indication of priority rules emphasizes a road user currently entitled to priority and, when the vehicle is not currently entitled to priority, a warning that the driver is not currently entitled to enter the crossing or intersection.

2. The method of claim 1, further comprising:
    determining a ranking for the vehicle and the road users to drive on or drive over the crossing or intersection based on a formation of the crossing or intersection, positions of the road users, and the priority rules,
    wherein optical information conveying the ranking is emitted to the driver as indications (1) overlapping the surrounding environment on the display unit or (2) overlapping the image of the surrounding environment.

3. The method of claim 2, wherein the ranking is conveyed as digits or symbols allocated to the road users and the vehicle emitted on the display unit as optical information.

4. The method of claim 1, further comprising:
    detecting an order in which the road users and the vehicle reach the crossing or intersection.

5. The method of claim 2, wherein the ranking is determined based on the order of reaching the crossing or intersection.

6. The method of claim 2, wherein digits or road signs are depicted and allocated to the road users and the vehicle as optical indications of the ranking.

7. The method of claim 1, wherein the road users include vehicles and pedestrians.

8. The method of claim 1, wherein the road users include vehicles, pedestrians, and motorized and unmotorized two-wheeled vehicles.

9. The method of claim 1, wherein the emission of the indication of priority rules is activated when it is detected that the vehicle is approaching the crossing or intersection.

10. The method of claim 1, wherein when it is detected that the vehicle will drive over a stop line without stopping, an additional visual warning is emitted.

11. An apparatus for supporting a driver when driving a vehicle, the device comprising:
    a monitoring unit configured to monitor a surrounding environment of the vehicle;
    a detection unit configured to detect road users at a crossing or intersection;
    a control unit configured to determine an order of arrival of the road users at the crossing or intersection;
    a display unit coupled to the control unit and configured to emit indications of priority rules to the driver,
    wherein the display unit and the control unit are configured so that the indications are emitted to the driver (1) overlapping the surrounding environment on a display unit or (2) overlapping an image of the environment,
    wherein the emitted indication of priority rules emphasizes a road user currently entitled to priority and, when the vehicle is not currently entitled to priority, a warning that the driver is not currently entitled to enter the crossing or intersection.

12. The apparatus of claim 11, further comprising:
    an evaluation unit configured to determine a ranking of the vehicle and the road users to drive on or drive over the crossing or intersection based on a formation of the crossing or intersection, positions of the road users or the vehicle, and the priority rules,
    wherein optical information conveying the ranking is emitted to the driver as indications (1) overlapping the surrounding environment on the display unit or (2) overlapping the image of the environment.

13. The apparatus of claim 11, wherein the road users include vehicles and pedestrians.

14. The apparatus of claim 11, wherein the road users include vehicles, pedestrians, and motorized and unmotorized two-wheeled vehicles.

15. The apparatus of claim 11, wherein the emission of the indication of priority rules is activated when it is detected that the vehicle is approaching the crossing or intersection.

16. The apparatus of claim 11, wherein when it is detected that the vehicle will drive over a stop line without stopping, an additional visual warning is emitted.

* * * * *